United States Patent [19]

Tai

[11] Patent Number: 5,054,100
[45] Date of Patent: Oct. 1, 1991

[54] PIXEL INTERPOLATOR WITH EDGE SHARPENING

[75] Inventor: Hwai T. Tai, Rochester, N.Y.

[73] Assignee: Eastman Kodak Company, Rochester, N.Y.

[21] Appl. No.: 437,466

[22] Filed: Nov. 16, 1989

[51] Int. Cl.$^5$ .............................................. G06K 9/00
[52] U.S. Cl. ...................................... 382/47; 382/22; 382/54; 340/728
[58] Field of Search ..................... 382/47, 54, 22, 41; 340/728, 731; 358/166, 96, 428, 445, 447, 463

[56] References Cited

U.S. PATENT DOCUMENTS

| | | | |
|---|---|---|---|
| 4,381,547 | 4/1983 | Ejiri | 382/47 |
| 4,578,812 | 3/1986 | Yui | 382/41 |
| 4,611,349 | 9/1986 | Hou | 382/47 |
| 4,630,307 | 12/1986 | Cok | 382/25 |
| 4,653,013 | 3/1987 | Collins et al. | 364/518 |
| 4,783,840 | 11/1988 | Song | 382/54 |
| 4,876,610 | 10/1989 | Oshawa et al. | 382/54 |

OTHER PUBLICATIONS

Smith, M. W. and Davis, W. A. "A New Algorithm for Edge Detection", Computer Graphics and Image Processing, No. 4, (1975) pp. 55–62.

Primary Examiner—Leo H. Boudreau
Assistant Examiner—Barry Stellrecht
Attorney, Agent, or Firm—Norman Rushefsky

[57] ABSTRACT

Methods and apparatus for interpolating existing gray-level pixel data to obtain new pixel values during image reduction and enlargement. A quadratic interpolation equation is used to apply location weighting factors to the density values of neighboring pixels. Edge strength modifying factors are used to modify the weighting factors in the x, y, and diagonal directions. In one embodiment, the modifying factors are set to greater than unity when the corresponding edge strength is greater than a predetermined threshold value. In another embodiment, the modifying factors are a non-linear function of the edge strength. These techniques preserve the sharpness of high contrast edges in the original image.

14 Claims, 2 Drawing Sheets

PIXEL INTERPOLATOR WITH EDGE SHARPENING

BACKGROUND OF THE INVENTION

Field of the Invention

This invention relates, in general, to image processing and, more specifically, to electronic photocopiers and printers which digitally enlarge and reduce an image defined by stored gray-level values.

Image information which is in the form of digital data not only can be stored in electronic memory but can also be processed to change the image which the data represents. Translation of digital images can, therefore, be accomplished by altering the data in memory and/or creating new data from the original data. Such translations are often required when the image is to be enlarged, reduced, rotated, or moved to another location. Electronic copiers, wherein the images to be copied are scanned and stored in memory, can use this technique of altering or translating the image for making copies which are not exactly the same as the original image.

While digital processing of gray-level image data offers numerous options in creating new and different images, the new data can suffer from a decrease in contrast resolution or sharpness in the processed image. This occurs because of the manner in which the processing methods generally used to translate the image data operate upon the data. For example, a well known method of translating data involves the use of interpolation where new pixel values are determined based upon the values of neighboring pixels and the relative location of the new pixel to the neighboring pixels. This technique inherently smooths the high-contrast edges in the original image by creating pixels with values which are between the high and low density values at these edges in the image.

One method for reducing the effects of sharpness reduction in digitally translated images is to use a more sophisticated algorithm or process in developing the new data. When bilinear interpolation is used for such processing, the quadratic nature of the equations used in the process usually causes no significant processing or memory problems in normal applications. However, high order processing, such as cubic processing, begins to approach the limits of conventional hardware to process the data quickly and efficiently enough even though they can offer better sharpness control over bilinear techniques. Therefore, such processing presents other problems which require solutions. U.S. Pat. No. 4,578,812, issued on Mar. 25, 1986, discloses an interpolation system which uses cubic or third order equations to calculate the new pixel values. In order to increase the speed of this process, the necessary devices are implemented in hardware, and the required weight factors used in the computations are calculated prior to the processing and stored in memory for recall during the processing. In this manner, time is not used during data processing to calculate the many weight factors or equation coefficients which are needed in the calculations.

Another technique for improving the sharpness of the new data is to use enhancement processing before or after the new data is created. Pre-processing of the data conditions the data to be processed and can be used to reduce the smoothing produced by such methods as bilinear interpolation. Post-processing can also be used to enhance the edges in the new data. However, post-processing involves a larger amount of data when the image is being enlarged, and this requires large capacity and fast processing in the enhancement portion of the process to be effective and feasible.

U.S. Pat. No. 4,381,547, issued on Apr. 26, 1983, discloses another processing technique whereby the weight coefficients are calculated ahead of the actual processing and stored in memory to improve the speed of the overall process. U.S. Pat. No. 4,611,349, issued on Sept. 9, 1986, discloses an image scaling technique which uses edge detection in the process. Although the technique is defined in relation to a binary, one-bit data representation of the image rather than to gray-level data, the patent does recognize that processing at an edge in an image is important. In this patent, the same type of nearest neighbor processing algorithm is used in the vicinity of an edge, but the data it processes is different. Individual bits are processed at the edges whereas a complete byte of binary data is processed otherwise.

Therefore, it is desirable, and it an object of this invention, to provide a pixel processing system which can maintain the sharpness of an edge in the processed image without the need to use high-order processing equations which involve critical memory and speed considerations in determining if they are efficient and practical.

SUMMARY OF THE INVENTION

There is disclosed herein a new and useful system for processing existing pixel data to obtain new pixel data representative of a new image corresponding to an enlarged, reduced, or translated image in the existing pixel data. The processing uses a nearest neighbor polynomial interpolation equation which effectively weights the values of the nearby pixels according to the relative distance between the nearby pixels and the new pixel. The weighting factors used in the equation are modified, according to this invention, by a factor which increases the contribution made by a particular pixel depending upon the edge strength of the pixels in the original data.

According to one specific embodiment of the invention, a quadratic bilinear interpolation equation is used to determine the value of components in the x, y and diagonal directions. Edge strength equations are used to determine the edge strengths in the corresponding directions and, when they exceed a predetermined threshold value, the weighting factors in the bilinear interpolation equation are modified to increase the component value in the corresponding direction. In another embodiment of the invention, the modifying factors are changed according to a non-linear function of the calculated edge strength. In both embodiments, the resulting pixel values maintain much of the sharpness existing in the original image, thereby reducing the need for enhancement processing before or after the interpolation processing. Since the sharpness enhancement is performed simultaneously with the determination of the new pixel values according to this invention, the amount of memory and the speed of operation is significantly improved over prior art systems which required extra processing, or interpolation algorithms of a higher order.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
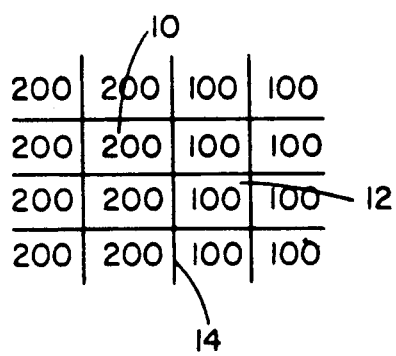
FIG. 1 is a table showing typical existing data before being processed.

Throughout the following description, similar reference characters refer to similar elements or members in all of the figures of the drawings.

Referring now to the drawings, and to FIG. 1 in particular, there is shown data which represents the density value of pixel locations in a bit map of a digital image. For example, pixel location 10 has a digital value of 200, and pixel location 12, which is diagonally adjacent to location 10, has a digital value of 100. For the purposes of describing the invention, all of the digital values will be assumed to be eight-bit values with a decimal range between zero and 255, although other bit levels may be used within the contemplation of the invention. The data in FIG. 1 is a portion of the bit map produced by the existing data which is to be transformed into the new data to produce the new image. With an electrophotographic copier, the existing data may be derived from scanning an original document with an electronic scanner which converts the optical signals into electrical signals. For use with a printer, the data may be produced by creating text or graphics representations at a workstation and converting that information into the digital information partially shown in FIG. 1. Whatever the source of the data, it is necessary to derive new data from the existing data when changing the size, shape, or location of the old image.

The digital values above and below pixel location 10 all have a digital value of 200. Similarly, the pixel locations above and below location 12 all have the digital value of 100. Because of the large difference in density represented by the 100 and 200 values, the data in FIG. 1 is representative of an edge located within the image. In other words, there is a sharp cutoff or border between high and low density areas between pixel location 10, including those above and below it, and pixel location 12, and those above and below it.

In order to derive new data from the data shown in FIG. 1, it is necessary to determine or calculate values for pixel locations which are different than the locations shown in FIG. 1. For example, when enlarging the image represented by the data in FIG. 1, it is necessary to acquire more pixel locations with digital values to provide the necessary number of pixel locations needed in the enlarged image. This requires that additional values be inserted in the existing data and, as a result thereof, new values will be calculated for the entire image, including the edges contained therein.

Figure 2:
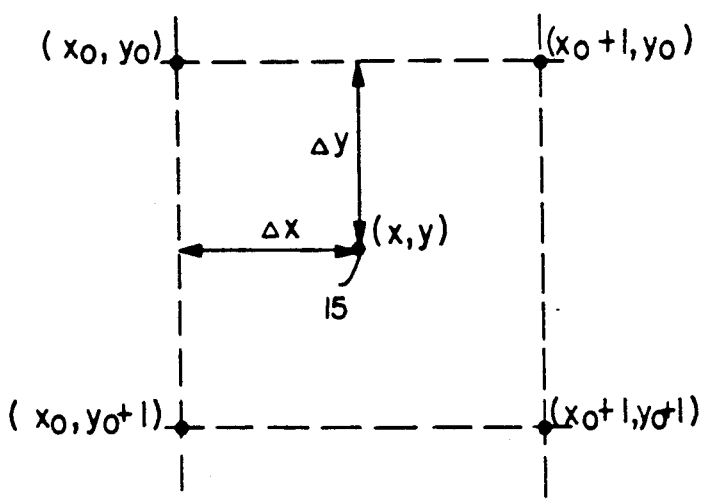
FIG. 2 is a graph illustrating the relative positions of a new pixel and the neighboring existing pixels.

FIG. 2 illustrates the relationship between new and existing pixels which can exist during the process of constructing or calculating new values for new pixel locations. According to FIG. 2, the new pixel 15, having coordinates (x,y), is located at arbitrary distances $\Delta x$ and $\Delta y$ from existing and neighboring pixels with coordinates $(x_0, y_0)$, $(x_0, y_0+1)$, $(x_0+1, y_0)$, and $(x_0+1, y_0+1)$. Since the value of new pixel 15 is created from the values of the neighboring pixels, an interpolation technique is usually used to weight the contribution of the nearby existing pixels to the new value according to the relative location of the new and existing pixels.

Using the nearest neighbor approach to determine the digital values of new pixels is a technique known in the prior art. One such technique frequently used is known as bilinear interpolation. This technique weights the values of the existing neighboring pixels with the differences in location in the x, y, and diagonal directions. Mathematically, this can be represented by the equation:

$$P(x, y) = G(x_0, y_0) * (1 + x_0 - x) * (1 + y_0 - y) + \quad (1)$$
$$G(x_0 + 1, y_0) * (x - x_0) * (1 + y_0 - y) +$$
$$G(x_0, y_0 + 1) * (1 + x_0 - x) * (y - y_0) +$$
$$G(x_0 + 1, y_0 + 1) * (x - x_0) * (y - y_0)$$

where P(x,y) is the new pixel value being calculated, G( ) is the gray-level value for the pixel identified within the parentheses, and the coordinates correspond to the pixel location illustrated in FIG. 2. While this polynomial equation can provide the value for the new pixel, there is a certain inherent smoothing of the edges of high contrast within the image by use of the equation because of the contributions made to the new value by both high and low density pixels at the edge location.

Figure 3:
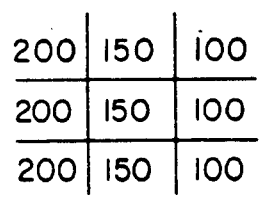
FIG. 3 is a table showing data after being processed according to a prior art technique.

FIG. 3 is a table illustrating pixel values calculated according according to the quadratic bilinear interpolation equation (1). The calculations assume that the data shown in FIG. 1 is used, and that the new pixel being calculated is directly on the original edge defined by the high and low density values 200 and 100 shown in FIG. 1. In other words, in FIG. 2, the two existing pixels with coordinate $x_0$ have a value of 200, and the pixels having the coordinate $x_0+1$ have the digital value of 100. These are separated by the line 14 in FIG. 1.

By substituting the digital values into equation (1), and by assuming that the differential spacing between full coordinate positions of the existing pixels is unity or one, equation (1) becomes:

$$P(x, y) = 200 * (1/2) * (1/2) + 100 * (1/2) * (1/2) + \quad (1A)$$
$$200 * (1/2) * (1/2) + 100 * (1/2) * (1/2)$$
$$= 150.$$

This provides the digital value of 150 for the new pixel locations along the edge of the image, and as tabulated in FIG. 3. Pixel values to the left and right of the edge remain the same as in the original or existing data because of the similarity or equality of the data used in these regions to construct the new pixels. For example, when all of the neighboring pixels have a value of 200, the bilinear interpolation equation (1) becomes:

$$P(x, y) = 200 * (1/2) * (1/2) + 200 * (1/2) * (1/2) + \quad (1B)$$
$$200 * (1/2) * (1/2) + 200 * (1/2) * (1/2)$$
$$= 200.$$

As can be seen, the new value of 200 is the same as the existing values of the neighboring pixels. By similar reasoning, a new value of 100 would be produced when all of the neighboring pixels had a digital value of 100, as they do to the right of line 14 in FIG. 1.

FIG. 3 illustrates the inherent smoothing effect of using such a bilinear interpolation technique. Although the existing data in FIG. 1 shows a large density change of 100 across the edge in the image, the data in FIG. 3 indicates that the transition value of 150 is used to represent a pixel at the edge of the image. In other words, the edge is not represented as being as sharp since the density change of 100 occurs over two pixels rather than over one pixel, as in the original image. Therefore, it is desirable to be able to calculate new pixel values without losing much of the sharpness or density differences between adjacent pixels along edges in the image being processed.

The following equations represent the location differences in the x, y, and diagonal directions:

$$\Delta x = x - x_0 \quad (2)$$

$$\Delta y = y - y_0 \quad (3)$$

$$\Delta x * \Delta y = (x - x_0) * (y - y_0). \quad (4)$$

By substituting equations (2), (3) and (4) into equation (1), and rearranging the equation, the bilinear interpolation equation can be represented as:

$$P'(x, y) = G(x_0, y_0) + (G(X_0 + 1, y_0) - \quad (5)$$
$$G(x_0, y_0)) * A_x * \Delta x +$$
$$(G(x_0, y_0 + 1) - G(x_0, y_0)) * A_y * \Delta y +$$
$$(G(x_0, y_0) + G(x_0 + 1, y_0 + 1) -$$
$$G(x_0 + 1, y_0) - G(X_0, y_0 + 1)) *$$
$$A_{xy} * \Delta x * \Delta y$$

where $P'(x,y)$ is the new value being calculated according to this equation, and the quantities $A_x$, $A_y$, and $A_{xy}$ are modifying factors which are used to modify the weighting factors in the equation which depend upon the location of the new and existing pixels. $A_x$ is the modifying factor for the portion of the equation corresponding to the x direction, factor $A_y$ is the modifying factor for the portion of the equation in the y direction, and factor $A_{xy}$ is the modifying factor for the portion of equation corresponding to the diagonal direction. These modifying factors are assigned values in the calculations depending upon the edge strength of the image edge in the corresponding directions.

The edge strength is represented by the equations:

$$E_x = |G(x_0 + 1, y_0) - G(x_0, y_0)| \quad (6)$$

$$E_y = |G(x_0, y_0 + 1) - G(x_0, y_0)| \quad (7)$$

$$E_{xy} = |(x_0, y_0) + G(x_0 + 1, y_0 + 1) - \quad (8)$$
$$G(x_0 + 1, y_0) - G(x_0, y_0 + 1)|$$

where $E_x$ is the edge strength in the x direction, $E_y$ is the edge strength in the y direction, and $E_{xy}$ is the edge strength in the diagonal direction.

Equations (6), (7) and (8) determine the value of the modifying or amplifying factors used in equation (5). By using this technique, the equation (5), which is used to calculate the new value according to this invention, effectively recognizes an edge of high contrast in the image data and modifies the equation to provide a value for the new pixel which will not reduce the sharpness of the new image as much as conventional techniques.

The edge strength is primarily the absolute valves of the differences between the pixels in the corresponding directions. In other words, the value of edge strength at the edge shown in the original data of FIG. 1 is 100 in the x direction, 0 in the y direction, and 100 in the diagonal direction. By using a threshold or non-linear functional relationship between the edge strength and the value of the amplifying or modifying factors, equation (5) can produce new pixel values which preserve the sharpness of the newly formed image data without the necessity of post-enhancement or pre-enhancement processing, and without the need to use more sophisticated and time consuming higher order interpolation equations.

Figure 4:
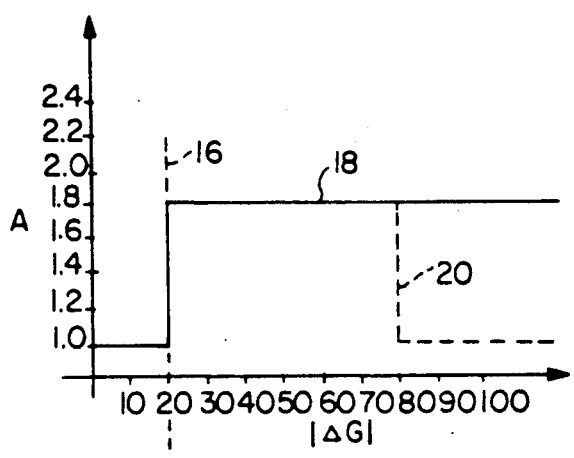
FIG. 4 is a graph illustrating a particular relationship between the edge strength and the weight factor multipliers.

FIG. 4 is a graph illustrating the relationship between the edge strength equations (6), (7) and (8) and the amplifying or modifying factors $A_x$, $A_y$, and $A_{xy}$ used in equation (5). It has been found that a threshold limit 16 for the edge strength can be used to determine the value of the modifying factor. According to the specific embodiment shown in FIG. 4, the modifying factor remains at unity or a value of 1 when the edge strength is below the value of 20. When the edge strength is above 20, the modifying factor changes to a predetermined value, which in this case is 1.8 as indicated by curve 18. In another embodiment of the invention, the modified curve 20 may be used to change the modifying factor back to unity when the edge strength is above a predetermined value, with 80 being illustrated in FIG. 4. Experimentation has shown that threshold levels between 10 and 30, upper limits of 60 to 80, and factor values of 1.8 to 2.3 give improved sharpness in the new image. It is also within the contemplation of the invention that the value of the modifying factors may be based upon a non-linear function which is dependent upon the edge strength. In any event, the x, y, and diagonal components of the interpolation equation (5) are modified based upon the calculated edge strengths in the existing data corresponding to the same directions.

Figure 5:
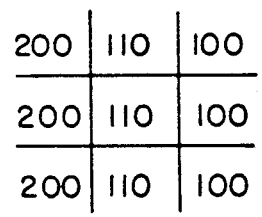
FIG. 5 is a table showing data after being processed according to the present invention.

FIG. 5 is a table which illustrates new pixel data constructed or calculated according to the teachings of this invention. By substituting the existing data at the edge of the image into equation (5), the equation becomes:

$$P'(x, y) = 200 + (100 - 200) * 1.8 * (1/2) + \quad (5A)$$
$$(200 - 200) * 1.0 * (1/2) +$$
$$(200 + 100 - 100 - 200) * 1.0 * (1/2) *$$
$$(1/2) = 110.$$

Note that a modifying factor of 1.8 is used since the edge strength in the x direction is greater than the threshold value of 20.

Equation (5A) indicates a value of 110 for the new pixels in the edge region, as illustrated in the data of FIG. 5. As can be seen, this provides an improvement over the data constructed according to the prior art shown in FIG. 3, since a difference of 90 exists between two adjacent pixels according to the new system whereas a difference of only 50 existed according to the prior art. This effectively will make the lines and edges existing in the newly formed image appear sharper to the observer than the data constructed according to the prior art. Of course, since the enhancement of the edges is done simultaneously with the calculation of the new data, the overhead provided by pre-enhancement and post-enhancement techniques and higher order equations to accomplish a similar result is eliminated by the teachings of this invention.

Although the invention is described herein in connection with a bilinear interpolation equation using a two-by-two nearest neighbor pixel algorithm, the use of interpolation equations on three-by-three and four-by-four, or other pixel size areas, is within the contemplation of this invention. In such cases, additional modifying factors may be used in the equations based upon the edge strengths, depending upon the type of equations being used. In addition, other interpolation functions can be used rather than bilinear interpolation, such as bell, cubic B spline, and Gaussian functions.

Figure 6:
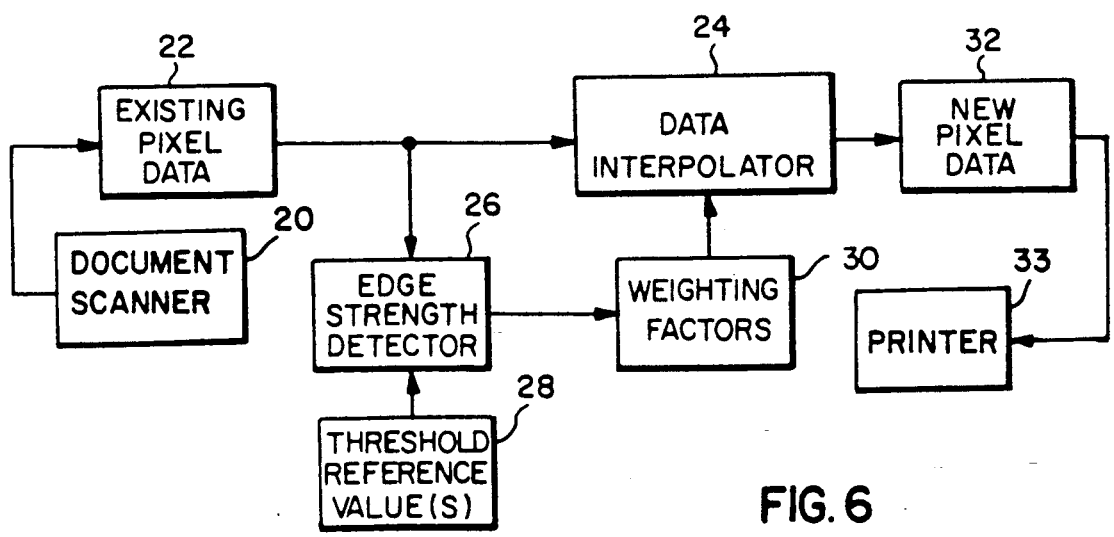
FIG. 6 is a block diagram of apparatus which may be used in practicing the invention.

FIG. 6 is a block diagram of apparatus which may be used to perform the functions of this invention. Signals representing existing pixel data 22 are generated say from scanning an image on an original document using a conventional document scanning device 20 applied to the data interpolator 24 which processes the existing data according to the algorithm or equation being used. The existing data 22 is also analyzed by the edge strength detector 26 to determine the edge strength in the x, y, and diagonal directions. When the edge strength is above the appropriate threshold reference value 28, the weighting factors 30 are appropriately modified and applied to the equations used by the data interpolator 24. By repeating the process a sufficient number of times, signals representing new gray-level values of new pixel data 32 are produced in which the edge sharpness in the image is significantly improved over prior art techniques which have not modified the weighting factors based upon the calculated edge strengths. In response to the signals representing new pixels a new image is reproduced by a suitable printer 33 on a suitable recording medium which new image retains much of the sharpness existing in the image on the original document and which new image may be a reduction or enlargement of that on the original document.

Figure 7:
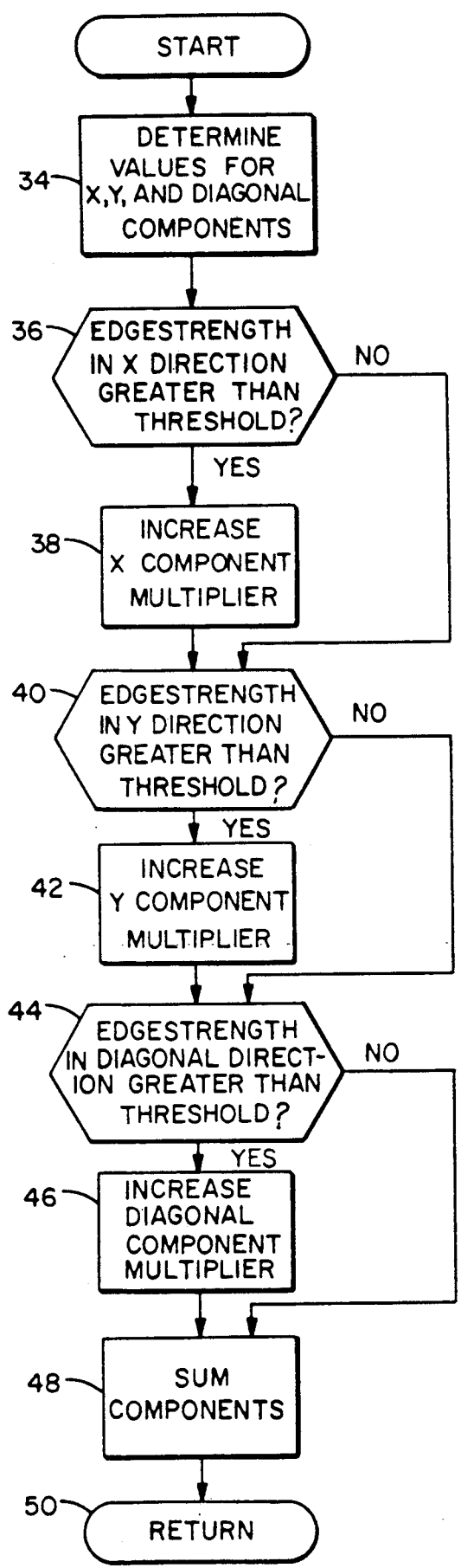
FIG. 7 is a flow chart which illustrates a software algorithm which may be used with the interpolation process of this invention.

FIG. 7 is a flow chart which illustrates a software algorithm which may be used to provide the interpolation system taught by this invention. According to FIG. 7, the weighted values of the x, y, and diagonal components of the new pixel value are determined based upon the magnitude and distance from the neighboring pixels, as indicated in box 34. Next, the edge strength in the x direction is tested to see if it is greater than a predetermined threshold, as shown in box 36. If the threshold is exceeded, the process proceeds to box 38 where the weight factor corresponding to the x component is increased by the modifying factor. If the threshold is not reached, process flow is transferred to box 40 where the edge strength in the y direction is tested to see if it exceeds the predetermined threshold. In a similar fashion, the multiplying factor for the y component is increased if the threshold is exceeded, as indicated in box 42, or the process flow is transferred to box 44 where the edge strength in the diagonal direction is tested. Depending upon the results of that test, the diagonal component modifier, or multiplier, is increased in box 46, or process flow proceeds directly to box 48 if it is to remain at unity. When all of the components have been properly weighted and multiplied by the edge strength dependent factors, they are summed to provide the resulting value for the new pixel location. Assuming that the flow chart of FIG. 7 represents a subroutine algorithm, it would return, as indicated in box 50, to the main program after the pixel value has been determined.

There has been disclosed herein a new, useful, and efficient system for improving the sharpness of images created from existing data by interpolation algorithms. It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A method of processing signals representing existing pixel data of an image on an original document to obtain signals representing new data representative of a new image to be printed which corresponds to the existing data, said method including the steps of:

scanning with suitable means to obtain the existing pixel data;

calculating new pixel values for creating signals representing new pixels throughout the existing data based upon signals representing the magnitudes of pixel values for existing other predetermined pixels;

recognizing when said other predetermined pixels are adjacent to an image edge of large density change;

modifying the calculating step to influence the magnitude of the calculated value for creating signals representing new pixels when the new pixels are recognized as being at said image edge;

wherein the pixel value for one of said new pixels is calculated by an equation which uses weighting factors to influence the value of the new pixel based upon the position of the new pixel relative to at least one of said other pixels and the weighting factors for x, y, and diagonal directions are each modified separately; and printing said new image in response to said signals representing new pixels which new image retains much of the sharpness existing in the image on the original document.

2. The processing method of claim 1 wherein an image edge is recognized when the magnitudes of said other predetermined pixels are different by at least a fixed threshold amount.

3. The processing method of claim 1 wherein the equation effectively performs a polynomial interpolation of the existing data to produce the new data.

4. The processing method of claim 4 wherein the equation performs a bilinear interpolation of the existing data.

5. The processing method of claim 3 wherein the other pixel values which are used to calculate the pixel value of the new pixel are the four values arranged in a two-by-two pattern around the location of the new pixel.

6. The processing method of claim 1 wherein the weighting factor is numerically increased when it is modified.

7. The processing method of claim 6 wherein the weighting factor is increased by a single predetermined multiplier value when it is modified.

8. A method of processing signals representing existing pixel data of an image on an original document to obtain signals representing other pixel data for enlarging or reducing the image represented by the existing pixel data, said processing method including the steps of:
scanning with suitable means to obtain the existing pixel data;
generating signals representing pixel values of new pixels based upon an interpolation of the magnitudes of neighboring pixel values in the existing data, said interpolation using weighting factors to determine the contribution made to a value of a new pixel by the neighboring existing pixels;
determining the absolute magnitude difference between at least two of the neighboring pixel values;
modifying the weighting factors based upon the magnitude difference determined;
wherein the weighting factors are used in a polynomial equation which interpolates the existing data to produce signals representing the new data and the weighting factors for x, y, and diagonal directions are each modified separately; and
printing an image in response to said signals representing new pixels which new image retains much of the sharpness existing in the image on the original document.

9. The processing method of claim 8 wherein the weighting factors are modified only when the magnitude difference exceeds a fixed threshold amount.

10. The processing method of claim 8 wherein the weighting factors are numerically increased when they are modified.

11. Apparatus for processing signals representing existing gray-level pixel data of an image on an original document to obtain signals representing pixel data for new pixels representative of an image enlarged or reduced from that of the existing data, said apparatus comprising:
means for scanning to obtain the existing pixel data;
means for performing an interpolation operation which produces signals representing a gray-level value for a new pixel based upon the value and location of neighboring existing pixels, said operation using weighting factors which affect the produced value; and
means for changing the value of each weighting factor when the absolute value of the magnitude difference between certain neighboring existing pixels is above a predetermined threshold level wherein separate weighting factors are used and changed for the x, y and diagonal directions of interpolation between the new and existing pixels; and
means for printing an image in response to signals representing gray-level values for new pixels which image is of different size from that on the original document but retains much of the sharpness existing in the image on the original document.

12. The processing apparatus of claim 11 wherein the weighting factor is numerically increased when it is changed due to the magnitude difference exceeding the threshold value.

13. A method of processing signals representing existing gray-level pixel data of an image on an original document to obtain signals representing new gray-level pixel data for enlarging or reducing the image originally represented by the existing pixel data, said processing method including the steps of:
scanning with suitable means to obtain the existing pixel data;
generating signals representing new pixel values in response to a bilinear interpolation calculation of the four neighboring pixel values located in a two-by-two pattern around each new pixel location, said calculation using the following equation:

$$\begin{aligned} P'(x, y) = &\ G(x_0, y_0) + (G(x_0 + 1, y_0) - \\ & G(x_0, y_0)) * A_x * \Delta x + \\ & (G(x_0, y_0 + 1) - G(x_0, y_0)) * A_y * \Delta y + \\ & (G(x_0, y_0) + G(x_0 + 1, y_0 + 1) - \\ & G(x_0 + 1, y_0) - G(x_0, y_0 + 1)) * \\ & A_{xy} * \Delta x * \Delta y \end{aligned}$$

where $P'(x,y)$ is the value of the new pixel being calculated, $G(\ )$ is the gray-level value for the pixel identified within the parentheses, $x_0$, $x_0+1$, $y_0$, and $y_0+1$ define the position of the values, $\Delta x = x - x_0$, $\Delta y = y - y_0$, $\Delta x * \Delta y = (x - x_0)*(y - y_0)$, and $A_x$, $A_y$, and $A_{xy}$ are weighting factor modifiers in the x, y, and diagonal directions, respectively;
determining when the edge strength at each new pixel is above a predetermined threshold value separately for the x, y, and diagonal directions according to the following equations:

$$E_x = G(x_0 + 1, y_0) - G(x_0, y_0)$$

$$E_y = G(x_0, y_0 + 1) - G(x_0, y_0)$$

$$\begin{aligned} E_{xy} = &\ G(x_0, y_0) + G(x_0 + 1, y_0 + 1) - \\ & G(x_0 + 1, y_0) - G(x_0, y_0 + 1) \end{aligned}$$

setting the weighting factor modifiers to unity when the corresponding edge strengths are less than the threshold value;
setting the weighting factor modifiers to a value greater than unity when the corresponding edge strengths are greater than the threshold value; and
printing a new image in response to signals representing new pixel values, which new image is of different size from that on the original document but retains much of the sharpness existing in the image on the original document.

14. The processing method of claim 13 wherein the value of the modifiers when set to greater than unity is always equal to a single value between the range of 1.1 and 2.3, and the threshold value is less than 10% of the maximum difference possible for the bit-level of the data.

* * * * *